United States Patent
Adams et al.

(10) Patent No.: US 7,287,917 B2
(45) Date of Patent: Oct. 30, 2007

(54) SYSTEM AND METHOD FOR INSTALLING AND RETAINING I/O CONNECTOR WITHOUT TOOLS

(75) Inventors: Eric Adams, Pittsboro, NC (US); Martin Joseph Crippen, Apex, NC (US); Pat Gallarelli, Chapel Hill, NC (US); Matthew Scott Henry, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/320,064

(22) Filed: Dec. 28, 2005

(65) Prior Publication Data

US 2007/0147746 A1  Jun. 28, 2007

(51) Int. Cl.
*G02B 6/36* (2006.01)
*H04B 10/00* (2006.01)

(52) U.S. Cl. ............... 385/92; 385/88; 398/135; 398/138

(58) Field of Classification Search ............... 385/88, 385/92; 398/135, 138
See application file for complete search history.

(56) References Cited

U.S. PATENT DOCUMENTS

| | | | |
|---|---|---|---|
| 5,879,173 A * | 3/1999 | Poplawski et al. | 439/138 |
| 6,267,606 B1 * | 7/2001 | Poplawski et al. | 439/92 |
| 6,371,787 B1 * | 4/2002 | Branch et al. | 439/352 |
| 6,502,998 B2 * | 1/2003 | Yen et al. | 385/88 |
| 6,916,123 B2 * | 7/2005 | Kruger et al. | 385/92 |
| 7,004,647 B2 * | 2/2006 | Malagrino et al. | 385/92 |
| 7,066,765 B2 * | 6/2006 | Togami et al. | 439/607 |

* cited by examiner

*Primary Examiner*—Kevin S Wood
*Assistant Examiner*—John M Bedtelyon
(74) *Attorney, Agent, or Firm*—VanLeeuwen & VanLeeuwen; Cynthia S. Byrd

(57) ABSTRACT

A system and method for installing and retaining an input/output connector without tools is presented. A user removes a module from a computer system in order to add or remove a transceiver. The module includes a housing and a front bezel, whereby a bezel latch attaches the front bezel to the housing. The user depresses the bezel latch to remove the front bezel from the housing. As a result, a retention beam is exposed on the housing that secures transceivers to a circuit board. The user unlatches the retention beam, inserts a transceiver onto a mounting area, and latches the retention beam. The retention beam applies pressure to the transceiver, which results in a coupling of the transceiver to a circuit board included in the housing. In turn, the user attaches the front bezel to the housing via the bezel latch and reinserts the module into the computer system.

7 Claims, 6 Drawing Sheets

SYSTEM AND METHOD FOR INSTALLING AND RETAINING I/O CONNECTOR WITHOUT TOOLS

BACKGROUND OF THE INVENTION

1. Technical Field

The present invention relates to a system and method for installing and retaining an input/output connector without tools. More particularly, the present invention relates to a system and method for adding a transceiver to a module without tools by means of a retention beam that applies pressure to the transceiver, resulting in a coupling of the transceiver to a circuit board included in the module.

2. Description of the Related Art

Customers require a computer system to be scalable and serviceable. Providing a customer with the ability to add functionality as needed in a quick, cost effective manner, is very important, especially for server architectures. In addition, providing the ability for the customer to service the computer system himself has cost advantages over a manufacturer's representative servicing the computer system.

A computer system may be scalable from both a software standpoint and a hardware standpoint. From a software standpoint, a software company may load an entire software suite onto a customer's computer system, and then activate particular features of the software suite based upon customer requirements.

From a hardware standpoint, however, scalability is not as straightforward. Depending upon the type of computer system, a customer may "overbuy" their current needs in anticipation of growth. For example, if a customer requires two ports of a 100 MB Ethernet switch, the user may buy an eight port Ethernet switch because of the low additional cost of the additional ports.

A challenge found is that for more expensive computer system technologies, overbuying is not a cost effective alternative. For example, in fiber optic computer systems, each fiber optic transceiver is relatively expensive, and a customer typically purchases only the amount of transceivers that the customer requires at the moment.

However, a challenge found with this approach is that a customer requires particular tools to install additional transceivers due to the transceiver module's configuration, which results in poor serviceability.

What is needed, therefore, is a system and method for easily installing transceivers into a module without the use of tools, resulting in increased serviceability.

SUMMARY

It has been discovered that the aforementioned challenges are resolved using a system and method for adding a transceiver to a module without tools by means of a retention beam that applies pressure to the transceiver, resulting in a coupling of the transceiver to a circuit board included in the module.

A user removes a module (e.g., optical pass through module) from a computer system. The module includes two main sections, which are a housing and a front bezel. The front bezel attaches to the housing by means of a bezel latch. In order to remove the front bezel from the housing, the user depresses the bezel latch and slides the front bezel off of the housing, all without the use of tools.

When the user removes the front bezel, a retention beam is exposed. In one embodiment, the retention beam is secured to the housing on one side via a latch mechanism, and on the other side via a hinge. In another embodiment, one side of the retention beam may be inserted into a housing opening and latched at the other end. In yet another embodiment, the retention beam may latch to the housing at both ends.

When the retention beam is in a "closed" position, the retention beam applies pressure to one or more transceivers that, in effect, couples the transceivers to a circuit board. In order to add or remove transceivers to the module, a user begins by unlatching the retention beam and rotating the retention beam to an "open" position, all without the use of tools. Once in the open position, the user places a transceiver onto a mounting area, which may include a mounting socket.

After the transceiver is correctly placed onto the mounting area, the user rotates the retention beam back to the closed position, which secures the transceiver and couples the transceiver to the circuit board. The user re-attaches the front bezel to the housing by sliding the front bezel onto the housing until the bezel latch latches. In turn, the user reinstalls the module into the computer system and connects the transceivers to applicable cabling.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1A:
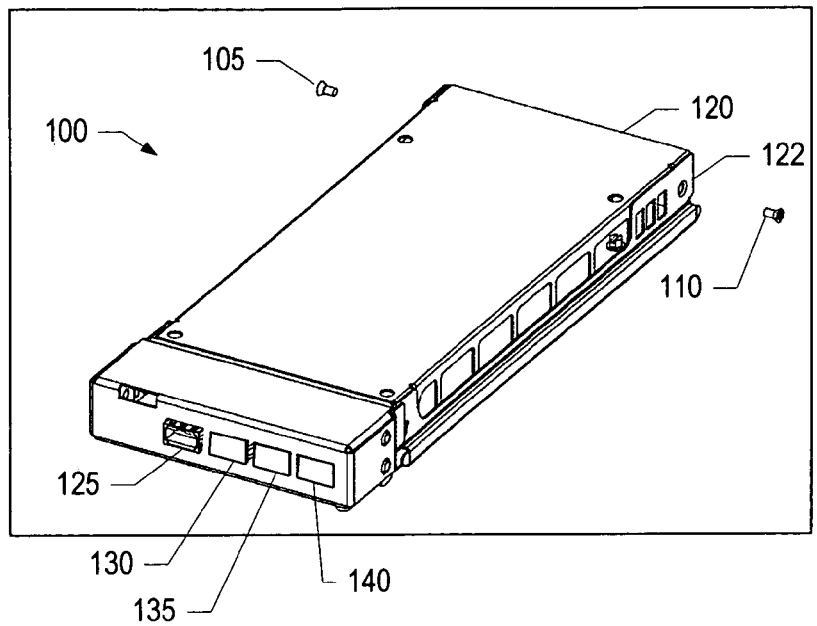
FIG. 1A is a diagram showing a first step in adding a transceiver to a computer system without the invention described herein.

FIG. 1A is a diagram showing a first step in adding a transceiver to a computer system without the invention described herein. A user's computer system includes a module, such as module 100, that houses one or more transceivers. For example, module 100 may be an optical pass through module that supports up to four fiber optic transceivers. As can be seen in FIG. 1A, one transceiver (transceiver 125) is protruding from one of module 100's transceiver openings. The other transceiver openings (openings 130-140) do not yet include a transceiver.

When a user wishes to add a transceiver to module 100, the user removes module 100 from the computer system, and removes cover 120 from housing 122. In order to perform this step, the user uses a tool, such as a screwdriver, to remove screws 105 and 110. Once screws 105 and 110 are removed, the user may remove cover 120 from housing 122, which exposes a circuit board included in module 100 (see FIG. 1B and corresponding text for further details).

Figure 1B:
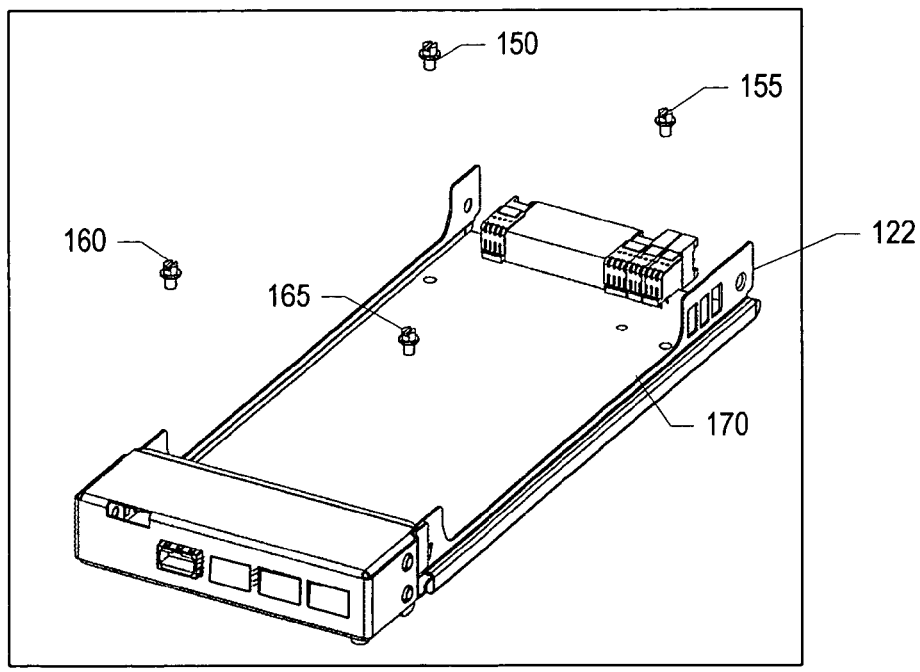
FIG. 1B is a diagram showing a process for removing a circuit board from a module without the invention described herein.

FIG. 1B is a diagram showing a process for removing a circuit board from a module without the invention described herein. To continue with the transceiver addition process discussed in FIG. 1A, FIG. 1B shows four screws (screws 150-165) that a user removes in order to remove circuit board 170 from housing 122. Again, a user must use a tool (e.g., screwdriver) to perform this step. Once screws 150-165 are removed, the user removes circuit board 170 from housing 122 in order to add a transceiver (see FIG. 2A and corresponding text for further details regarding circuit board removal).

Figure 2A:
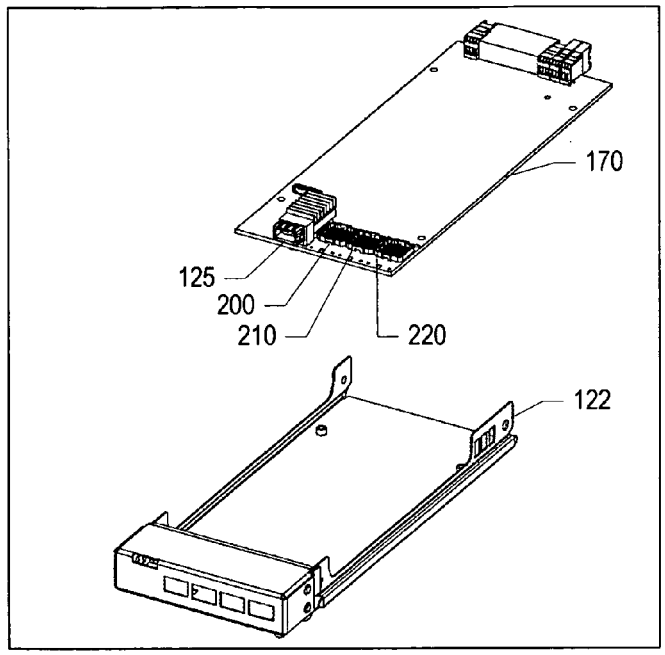
FIG. 2A is a diagram showing a process for removing a circuit board from a module without the invention described herein.

FIG. 2A is a diagram showing a process for removing a circuit board from a module without the invention described herein. Once a user removes screws that secure circuit board 170 to housing 122 (FIG. 1B), the user is able to remove circuit board 170 from housing 122. In turn, transceiver 125 and mounting areas 200-220 are exposed. As such, a user may insert one or more transceivers onto mounting areas 200-220 (see FIG. 2B and corresponding text for further details regarding transceiver mounting steps).

Figure 2B:
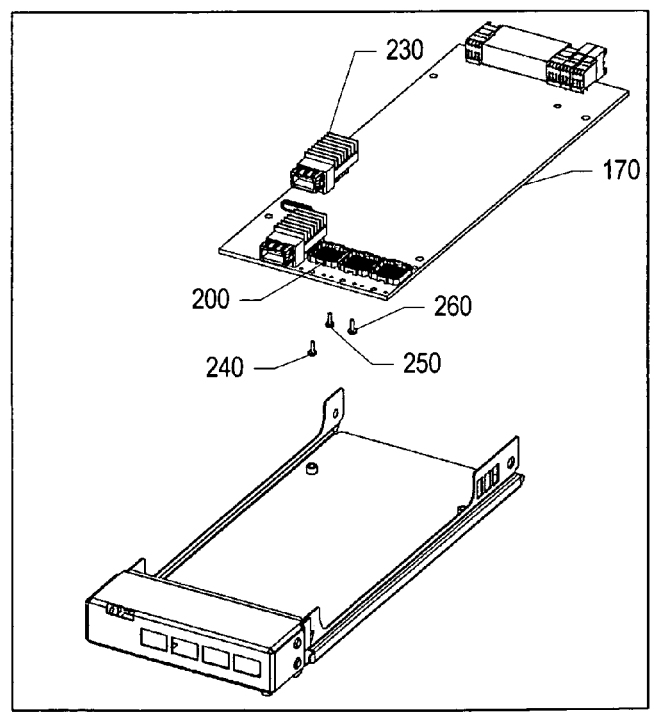
FIG. 2B is a diagram showing a process for attaching a transceiver to a circuit board without the invention described herein.

FIG. 2B is a diagram showing a process for attaching a transceiver to a circuit board without the invention described herein. In order to attach transceiver 230 to circuit board 170, a user places transceiver 230 onto mounting area 200. Once placed, a user secures transceiver 230 to circuit board 170 using a tool (e.g., screwdriver) and screws 240-260. After transceiver 230 is secured to circuit board 170, a user reassembles the module by reversing the steps discussed in FIGS. 1A-2A.

Figure 3A:
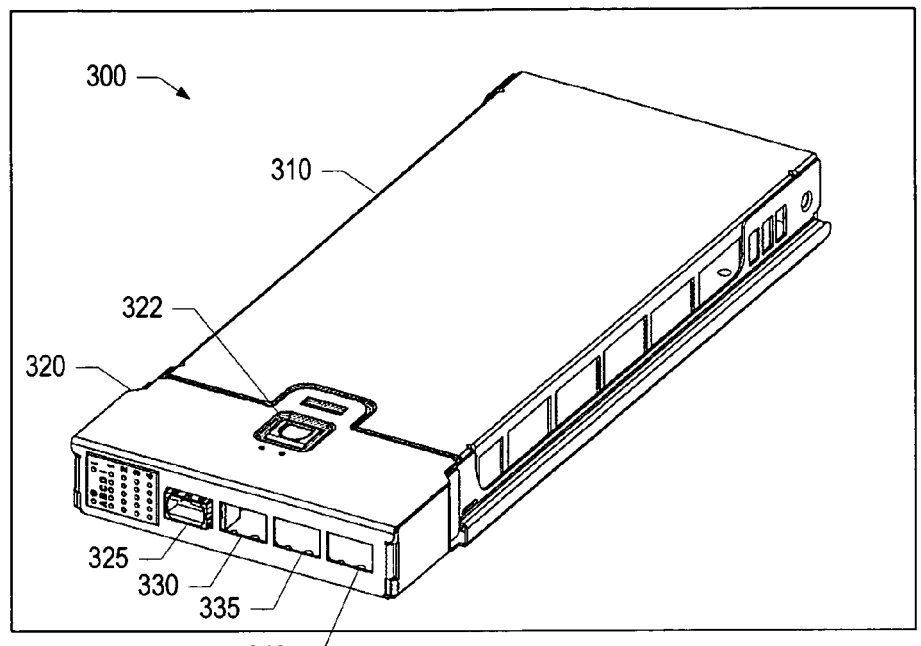
FIG. 3A is a diagram showing a module that is configured using the invention described herein.

FIG. 3A is a diagram showing a module that is configured using the invention described herein. Module 300's configuration allows a user to add or remove transceivers without the use of tools.

Module 300 includes two main sections, which are housing 310 and front bezel 320. Housing 300 includes a circuit board that couples to transceivers, such as transceiver 325, which protrude from one of front bezel 320's transceiver openings. Front bezel 320 also includes transceiver openings 330-340 for a user to add three more transceivers to module 300. As one skilled in the art can appreciate, module 300 may be manufactured to support more or less than four transceivers.

Front bezel 320 attaches to housing 310 by means of bezel latch 322. A user depresses bezel latch 322 and removes front bezel 320 from housing 310 as a first step to add a transceiver to module 300 (see FIG. 3B and corresponding text for further details).

Figure 3B:
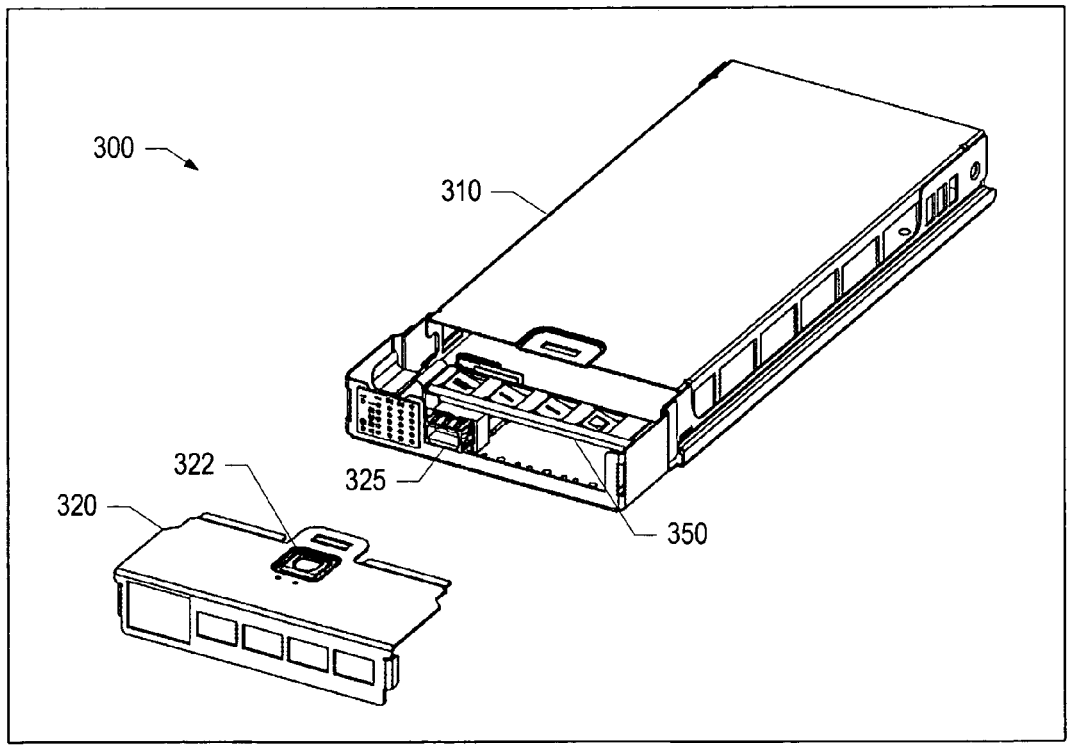
FIG. 3B is a diagram showing a front bezel detached from a module housing and exposing a retention beam that secures one or more transceivers to a circuit board.

FIG. 3B is a diagram showing a front bezel detached from a module housing and exposing a retention beam that secures one or more transceivers to a circuit board. A user detaches front bezel 320 from housing 310 by depressing bezel latch 322 and sliding front bezel 320 off of housing 310, all without the use of tools.

FIG. 3B shows retention beam 350, which is secured to housing 310 on both sides. In one embodiment, one side of retention beam 350 is hingeably attached (attached via a hinge) to housing 310, and the other side is latched to housing 310. In another embodiment, one side of retention beam 350 may be inserted into an opening in housing 310, and latched at the other end. In yet another embodiment, retention beam 350 may be latched to housing 310 at both ends.

FIG. 3B shows retention beam 350 in a "closed" position. When in a closed position, retention beam 350 applies pressure to transceiver 325 that, in effect, couples transceiver 325 to a circuit board that is included in housing 310. In order to add or remove transceivers to module 300, a user unlatches retention beam 350 and rotates retention beam to an "open" position (see FIG. 4A and corresponding text for further details). Module 300, housing 310, front bezel 320, and bezel latch 322 are the same as that shown in FIG. 3A.

Figure 4A:
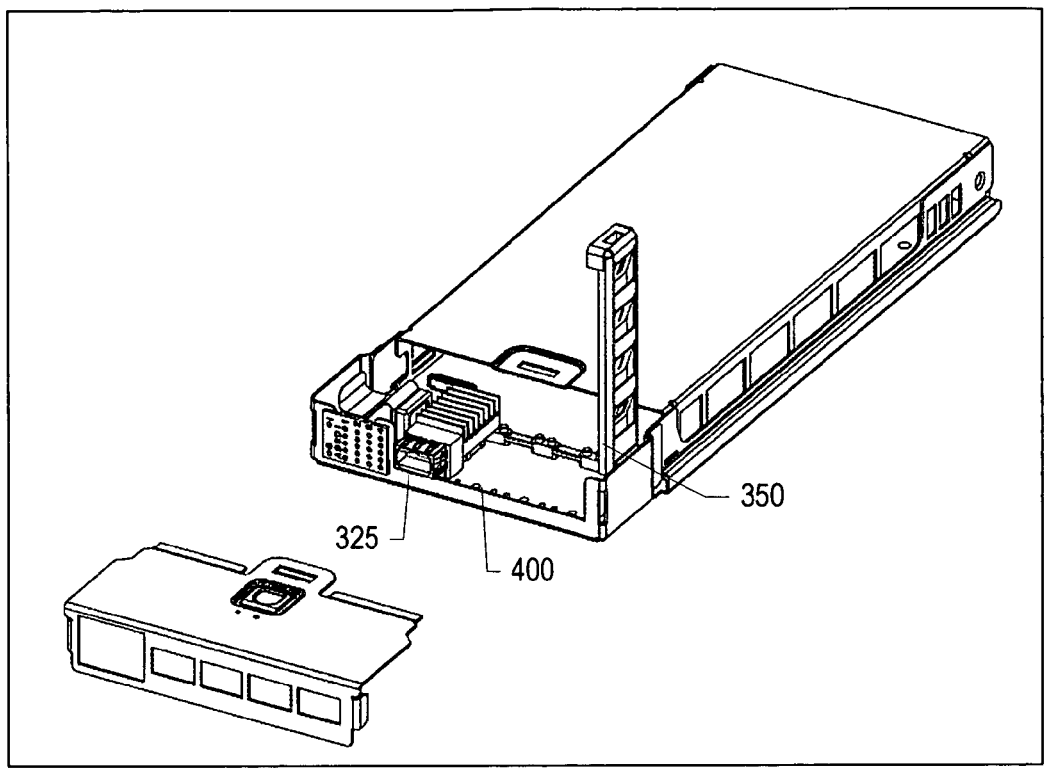
FIG. 4A is a diagram showing an unlatched retention beam that allows a user to insert one or more transceivers into a module without a tool.

FIG. 4A is a diagram showing an unlatched retention beam that allows a user to insert one or more transceivers into a module without a tool. FIG. 4A shows retention beam 350 in an "open" position, which exposes transceiver 325 and mounting area 400. Mounting area 400 includes mounting pins that couple to a transceiver when a transceiver is mounted. In one embodiment, mounting area 400 may include a mounting socket for mounting the transceiver. Transceiver 325 and retention beam 350 are the same as that shown in FIGS. 3A and 3B, respectively.

Figure 4B:
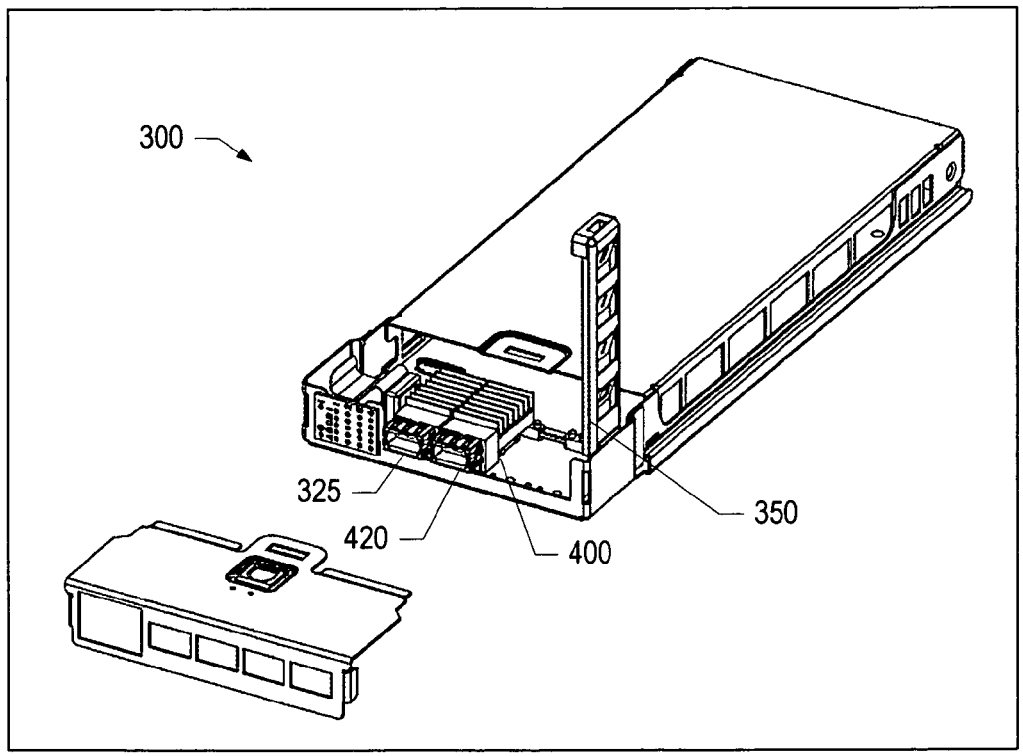
FIG. 4B is a diagram showing a transceiver inserted onto a mounting area.

FIG. 4B is a diagram showing a transceiver inserted onto a mounting area. Module 300 previously included transceiver 325. A user adds transceiver 420 to module 300 without the use of any tools by placing transceiver 420 onto mounting area 400. Once added, the user secures transceivers 325 and 420 by rotating retention beam 350 to a closed position (see FIG. 5A and corresponding text for further details). Module 300 and transceiver 325 are the same as that shown in FIG. 3A.

Figure 5A:
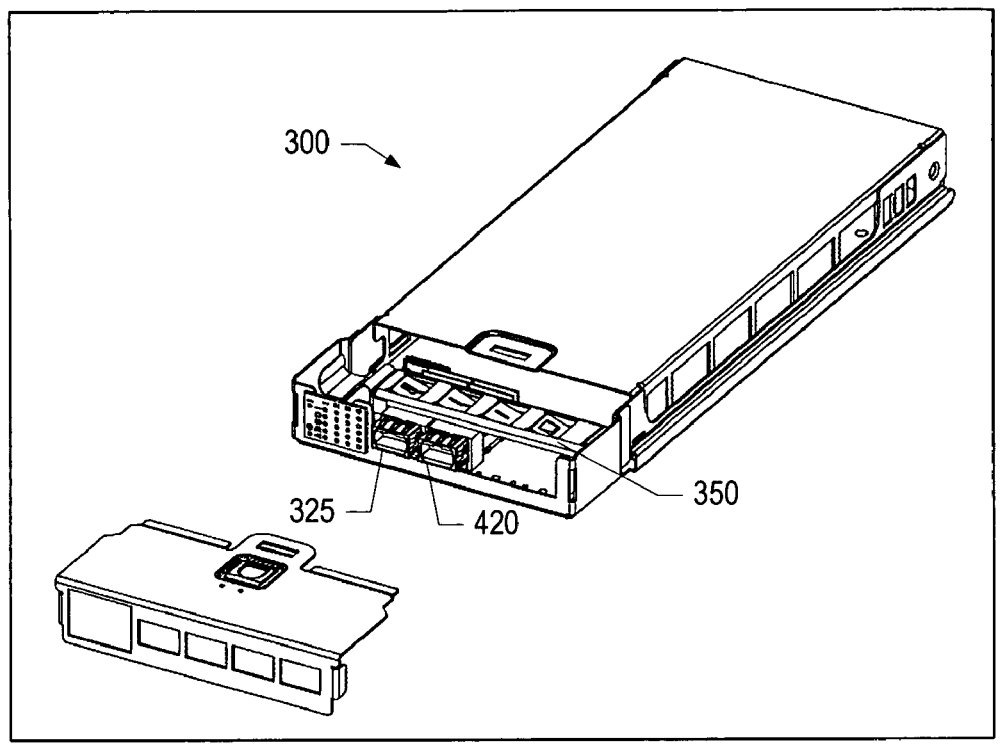
FIG. 5A is a diagram showing a retention beam latched in a closed position, which couples one or more transceivers to a circuit board.

FIG. 5A is a diagram showing a retention beam latched in a closed position, which couples one or more transceivers to a circuit board. Once a user places transceiver 420 onto a mounting area (FIG. 4B), the user rotates retention beam 350 to a closed position, which applies pressure to transceivers 325 and 420 and, as a result, couples transceivers 325 and 420 to a circuit board included in module 300. Module 300 is the same as that shown in FIG. 3A. Retention beam 350, transceiver 325, and transceiver 420 are the same as that shown in FIG. 4B.

Figure 5B:
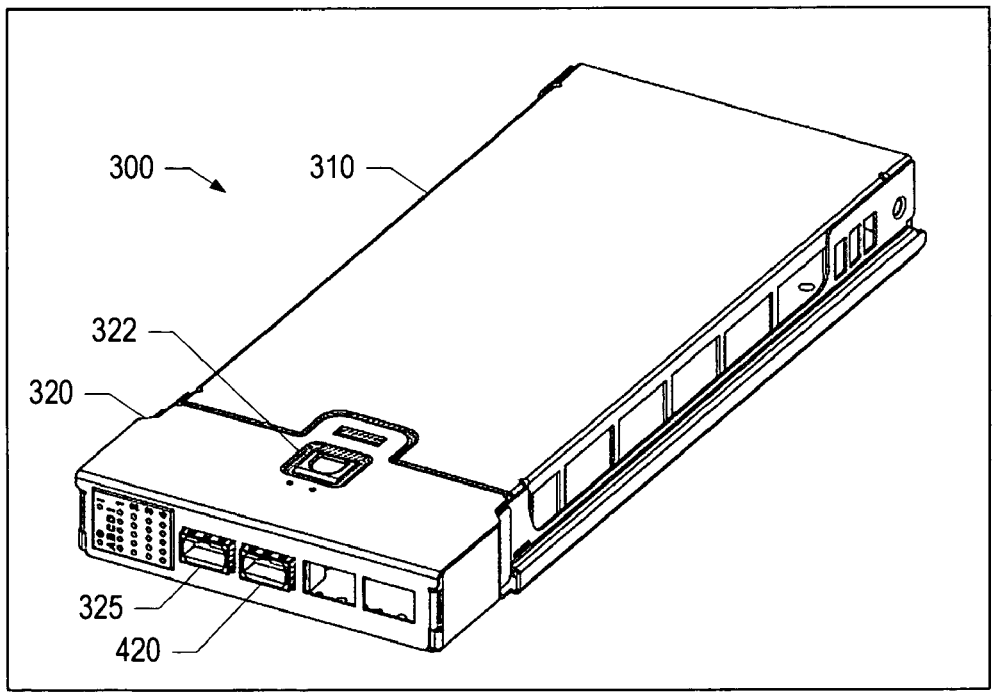
FIG. 5B is a diagram showing a front bezel latched to a module and two transceivers protruding from the front bezel's transceiver openings.

FIG. 5B is a diagram showing a front bezel latched to a module and two transceivers protruding from the front bezel's transceiver openings. Once a user installs an additional transceiver to module 300 (FIG. 5A), the user attaches front bezel 320 to housing 310 by sliding front bezel 320 onto housing 310 until bezel latch 322 latches.

Once latched, module 300 provides two transceivers (325 and 420) that protrude from front bezel 320 for a user to use.

In turn, the user reinstalls module 300 into a computer system and connects transceivers 325 and 420 to applicable cabling. Module 300, housing 310, front bezel 320, bezel latch 322, and transceiver 325 are the same as that shown in FIG. 3A. Transceiver 420 is the same as that shown in FIG. 4B.

Figure 6:
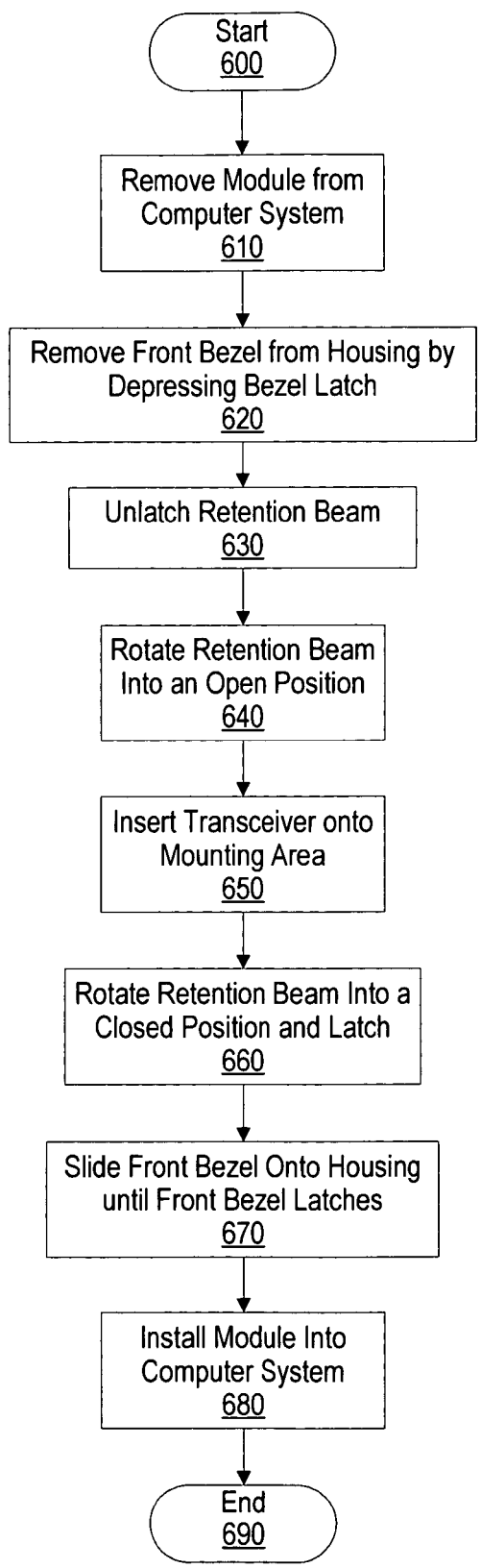
FIG. 6 is a flowchart showing steps taken in adding a transceiver to a module using the invention described herein.

FIG. 6 is a flowchart showing steps taken in adding a transceiver to a module using the invention described herein. The process of installing a transceiver into a module commences at 600, whereupon a user removes the module from a computer system (step 610). For example, a user may have a fiber optic computer system that includes optical pass thru modules. In this example, the user removes the optical pass thru module from the computer system in order to add a fiber optic transceiver to the optical pass thru module.

At step 620, the user removes the module's front bezel from the module housing by depressing a bezel latch and sliding the front bezel off of the housing (see FIG. 3B and corresponding text for further details). Once the front bezel is removed, a retention beam is exposed to the user. In one embodiment, the retention beam secures to the housing on one side of the retention beam, and latches to the housing on the other side of the retention beam.

At step 630, the user unlatches the retention beam and places the retention beam in an "open" position (step 640). The open position allows the user to add or remove transceivers to the module. For example, the retention beam may be hingeably attached to the housing and, in this example, the user rotates the retention beam to a position that exposes mounting areas to add additional transceivers (see FIG. 4A and corresponding text for further details).

The user inserts a transceiver onto a mounting area at step 650. The mounting area includes mounting pins that couple to electrical connections on the transceiver. After the transceiver is inserted, the user rotates the retention beam to a closed position and latches the retention beam to the housing (step 660). When the retention beam is latched, the retention beam applies pressure to the transceiver, which ensures contact between the transceiver's electrical connections and the circuit board's mounting pins.

Once the user latches the retention beam to the housing, the user attaches the front bezel onto the housing using the bezel latch (step 670), and installs the module back into the computer system (step 680). The transceiver adding process ends at 690.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for adding a transceiver to a module, the method comprising:
   depressing a bezel latch that is included on a front bezel;
   after the depressing, removing the front bezel from a housing included in the module;
   after the removing of the front bezel, unlatching a retention beam from the housing;
   in response to the unlatching, rotating the retention beam to an open position;
   in response to rotating the retention beam to an open position, inserting a transceiver into a mounting area corresponding to a circuit board included in the housing;
   in response to the inserting, rotating the retention beam to a closed position;
   in response to rotating the retention beam to the closed position, latching the retention beam to the housing, which applies pressure to the transceiver and results in a coupling of the transceiver to the circuit board included in the module;
   and
   after the latching, attaching the front bezel to the housing using the bezel latch.

2. The method of claim 1 wherein the method is performed without the use of a tool.

3. The method of claim 1 wherein the module is an optical pass through module and the transceiver is a fiber optic transceiver.

4. The method of claim 1 wherein the transceiver is not secured to the circuit board using screws.

5. The method of claim 1 wherein the transceiver is not soldered to the circuit board.

6. The method of claim 1 wherein the retention beam is hingeably attached to the housing at one end of the retention beam.

7. The method of claim 1 wherein the mounting area includes mounting pins that couple to electrical contacts included on the transceiver.

* * * * *